Jan. 5, 1943.　　　T. L. FAWICK　　　2,307,456
ASSEMBLY FOR DRIVING CLUTCHES AND THE
LIKE AND METHOD OF MAKING THE SAME
Original Filed March 18, 1937
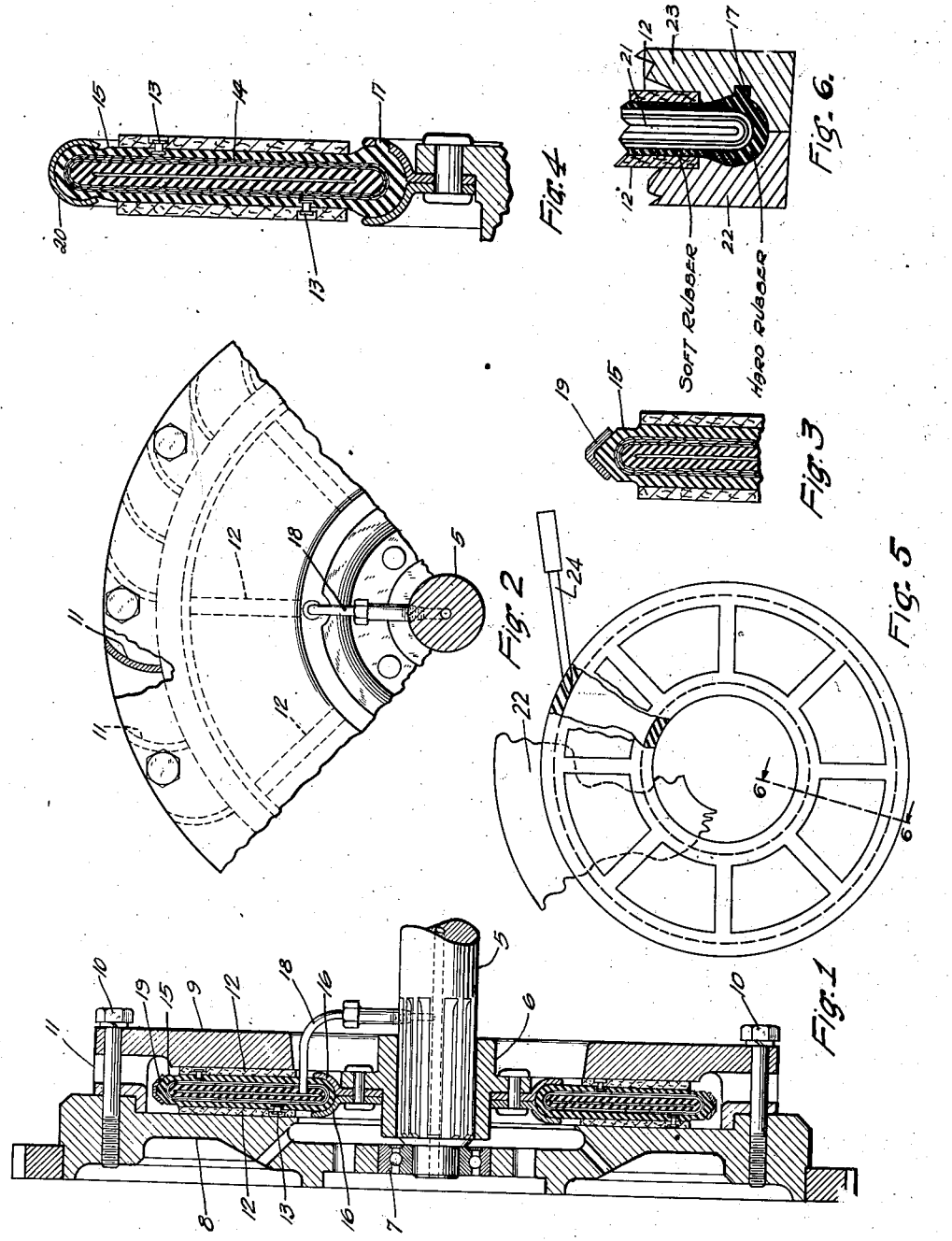
INVENTOR
Thomas L. Fawick
BY
Willard D. Eakin
ATTORNEY Patented Jan. 5, 1943

2,307,456

UNITED STATES PATENT OFFICE 2,307,456

ASSEMBLY FOR DRIVING CLUTCHES AND THE LIKE AND METHOD OF MAKING THE SAME

Thomas L. Fawick, Akron, Ohio, assignor to The Fawick General Company, Inc., Akron, Ohio, a corporation of Indiana Original application March 18, 1937, Serial No. 131,656. Divided and this application November 13, 1940, Serial No. 365,490

8 Claims. (Cl. 192—88)

This invention relates to assemblies suitable primarily for use as driving clutches, although some of its features are applicable also to flexible couplings and brakes, and to methods of making them. The present application is a division of my co-pending application Serial No. 131,656, filed March 18, 1937, upon which United States Patent No. 2,251,444 issued on August 5, 1941, and is in the same general field as my United States Patents 2,111,422, granted March 15, 1938, and 2,141,645, granted December 27, 1938.

The chief objects of the present invention are to provide an improved cushioning torque-transmitting means; to provide a pneumatic torque-transmitting member adapted for engagement and disengagement by the ingress and egress of a very small amount of air or other actuating fluid and thus, in the case of a clutch or a brake, to provide for quick engagement and disengagement; to provide for dependable complete disengagement although the range of engaging and disengaging movement is very short; to provide torque-transmitting means of great strength and at the same time adapted to cushion the action of the assembly; to provide improved torque-transmitting means adapted to compensate for shaft misalignment without undue resistance; to provide for effective dissipation of such frictional heat as may be generated; and to provide for lightness of parts, economy of construction and facility of replacement of parts.

Of the accompanying drawing:

Fig. 1 is a longitudinal section of an assembly embodying my present invention in its preferred form.

Fig. 2 is a fragmentary elevation of parts shown in Fig. 1, as viewed from the right of that figure, a part being broken away to show internal structure.

Fig. 3 is a fragmentary section of parts shown in Fig. 1, on a larger scale.

Fig. 4 is a similar section illustrating a slightly different form of pneumatic torque-transmitting member and associated parts.

Fig. 5 is a fragmentary plan view illustrating the preferred method of making the rubber bag of Fig. 4.

Fig. 6 is a section on line 6—6 of Fig. 5.

Referring to the assembly shown in Fig. 1, it comprises a transmission shaft 5 having a clutch hub member 6 straight-splined upon it, although this is not essential.

A pilot bearing 7 also is shown between the transmission shaft and the hub of the motor fly-wheel 8, although it also is not indispensible.

A metal ring 9, formed with an annular clutch engaging face providing a mate for a similar face formed on the fly-wheel, is secured to the fly-wheel 8 by screw bolts 10, 10 and this ring as shown in the present embodiment is formed also with through passages through an off-set peripheral portion, these passages being defined by outwardly curved webs or bridge pieces 11, 11 which can be integral with the rest of the ring as shown, to provide a centrifugal fan effect for drawing air and worn particles from the frictionally engaging faces of the assembly and discharging them at the outer periphery of the fly-wheel, for carrying away such frictional heat as may be developed and for keeping the friction faces and the bearing clean.

The arcuate clutch-facing plates, 12, 12, those of the two sets preferably being in staggered relation, are secured by rivets 13, 13, of which the bases are vulcanized in the opposite walls of an annular disc-like rubber bag 15, which can have either radial or oblique cord reinforcement, 14, the inner peripheral portion of the bag, as an anchoring portion, preferably being formed of relatively hard rubber and being gripped between annular clamping plates 16, 16 mounted upon the clutch hub member, and preferably interlocked with at least one of them by means of dowels such as the dowel 17 (Fig. 4) formed on the hard rubber base portion of the bag.

The bag is mold-vulcanized to a flat shape, with an extremely thin air chamber within it, as by building it about a ring of waxed paper, which can be left within it.

A flexible pipe 18 leads into the bag from a conduit formed in the transmission shaft, for alternatively applying fluid pressure and suction to the interior of the bag.

Preferably the bag has a ring of sheet metal 19 crimped upon its outer periphery, to sustain centrifugal force and prevent undesirable deformation of the bag under that force or under the force of internal fluid pressure.

In the operation of the assembly the clutch is engaged by conducting pressure fluid into the bag 15 through the pipe 18 and thus distending the bag axially, and disengaged by venting the fluid from the bag, and permissibly by applying suction to the interior of the bag, through the pipe 18.

The engaging faces are so disposed as to be effectively cooled by the fan action of the webs 11, and the torque is transmitted from the clutch facings to the clutch hub through an axially flat annular zone of the bag which is adapted to transmit the torque somewhat in the manner of a fabric universal-joint disc.

In the bag assembly shown in Fig. 4 the construction is substantially the same as in Figs. 1 and 3 except that the body of the bag, containing the cord reinforcements, is mold-vulcanized upon a thin annular metal plate, from which it is then stripped or "unbuttoned," so to speak, after cutting through its wall to the edge face of the plate in case of complete enclosure of the plate by the bag material, after which it is sealed at its outer margin, with or without an application of rubber cement, by crimping thereon a ring of sheet metal 20, this type of bag being adapted to be built economically by any one of several methods already known to those skilled in the rubber art.

In Figs. 5 and 6 the metal plate or mandrel employed for keeping the inner faces of the bag separated during its vulcanization is shown at 21 and the sections of the vulcanizing mold are shown at 22 and 23. After vulcanization of the bag in the mold the bag is removed from the latter, is cut through from its outer peripheral face to the metal plate 21 as by means of a knife 24, throughout the circle of the outer periphery of the bag, after which the plate 21 is removed from the bag by stretching and deformation of the rubber of the bag, and the cut faces of the bag are then sealed to each other as described in the last preceding paragraph.

Such frictional heat as is developed is generated only at the surface of a metal member which is of high heat capacity and consequently is adapted to conduct the heat away effectively.

I claim:

1. In combination with a pair of shafts mounted in series and subject to misalignment, a torque-transmitting assembly comprising a relatively rotary member having an engagement surface disposed transversely with relation to the axis of rotation, a fluid-distensible structure adapted to engage said surface upon being distended, and means for conducting pressure fluid to said structure to distend it, said structure having, throughout an annular zone thereof, a portion so mounted as to sustain all of the torque and to be unconfined and freely flexing in service and having substantially the characteristics of vulcanized soft rubber.

2. In combination with a pair of shafts mounted in series and subject to misalignment, a torque-transmitting assembly comprising a relatively rotary structure having a pair of engagement surfaces disposed transversely with relation to the axis of rotation, a fluid distensible structure adapted to engage both of said surfaces upon being distended and to withdraw from both of them in retracting, and means for conducting pressure fluid to said distensible structure to distend it, the assembly having, throughout an annular zone thereof, a disc-like portion so mounted as to sustain all of the torque and to be unconfined and freely flexing in service and having substantially the characteristics of vulcanized soft rubber.

3. In combination with a pair of shafts mounted in series and subject to misalignment, a torque-transmitting assembly comprising a relatively rotary structure having a pair of engagement surfaces disposed transversely with relation to the axis of rotation, a fluid distensible structure adapted to engage both of said surfaces upon being distended and to withdraw from both of them in retracting, and means for conducting pressure fluid to said distensible structure to distend it, said distensible structure comprising a one-piece bag having, throughout an annular zone thereof, a portion so mounted as to sustain all of the torque and to be unconfined and freely flexing in service and having substantially the characteristics of vulcanized soft rubber.

4. An assembly comprising a relatively rotary member having an engagement surface disposed transversely with relation to the axis of rotation, a fluid-distensible structure adapted to engage said surface upon being distended, and means for conducting fluid to said structure to distend it, said structure comprising an annular bag having substantially the characteristics of rubber and a metal restricting ring mounted on the outer periphery of the bag.

5. The method of making a fluid-distensible clutch structure which comprises producing of plastic material, upon an annular, disc-like mandrel, a fluid-distensible bag having a longitudinal slit through its wall and sealing said slit by clamping it shut.

6. The method of making a fluid-distensible clutch structure which comprises producing of plastic material, upon an annular, disc-like mandrel, a fluid-distensible bag having a longitudinal slit in its outer peripheral wall and sealing said slit by bending into clamping relation upon the outer periphery of the bag a metal ring adapted to serve as a retaining ring against centrifugal force in the rotation of the bag.

7. An assembly comprising a fluid-distensible bag having a body portion having substantially the characteristics of soft-vulcanized rubber and a base portion having substantially the characteristics of hard-vulcanized rubber, the base portion having dowel means projecting therefrom, and base-clamping means interlocked with said dowel means.

8. The method of making a fluid-distensible clutch structure which comprises molding of plastic material a fluid-distensible bag having a body portion having substantially the characteristics of soft-vulcanized rubber and a base portion having dowel means projecting therefrom and having substantially the characteristics of hard-vulcanized rubber, and then applying base-clamping means to said base portion in interlocked relation to said dowel means.

THOMAS L. FAWICK.